US010145501B2

(12) United States Patent
Fisher

(10) Patent No.: US 10,145,501 B2
(45) Date of Patent: Dec. 4, 2018

(54) PRESSURIZED FLUID LINE DERESONATOR

(71) Applicant: The Boeing Company, Chicago, IL (US)

(72) Inventor: Robert Earl Fisher, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/963,122

(22) Filed: Dec. 8, 2015

(65) Prior Publication Data
US 2017/0159868 A1 Jun. 8, 2017

(51) Int. Cl.
*F16L 55/027* (2006.01)
*F16L 55/033* (2006.01)

(52) U.S. Cl.
CPC ....... *F16L 55/027* (2013.01); *F16L 55/02709* (2013.01); *F16L 55/02718* (2013.01); *F16L 55/02727* (2013.01); *F16L 55/02754* (2013.01); *F16L 55/033* (2013.01); *F16L 55/0331* (2013.01); *Y10T 137/3118* (2015.04)

(58) Field of Classification Search
CPC ... F16L 55/033; F16L 55/0331; F16L 55/027; F16L 55/02718; F16L 55/02727; F16L 55/02754; F16L 55/02709; Y10T 137/3118
See application file for complete search history.

(56) References Cited

U.S. PATENT DOCUMENTS

| | | | | |
|---|---|---|---|---|
| 3,537,543 A | * | 11/1970 | Gibel | B05B 1/005 138/42 |
| 5,582,006 A | * | 12/1996 | Phillips | B62D 5/062 417/540 |
| 6,401,691 B1 | * | 6/2002 | Kawano | F02M 55/025 123/456 |
| 2004/0134550 A1 | * | 7/2004 | Treusch | F02M 37/0017 138/44 |
| 2012/0118408 A1 | * | 5/2012 | Holmgren | B64D 13/00 137/560 |
| 2015/0034165 A1 | * | 2/2015 | Conn | E21B 17/006 137/1 |

OTHER PUBLICATIONS

John L. Sewall, et al., An Investigation of Hydraulic-Line Resonance and Its Attenuation, National Aeronautics and Space Administration, Dec. 1973, 80 pages.
George R. Keller, Hydraulic Systems Analysis, Published by the Editors of Hydraulics & Pneumatics Magazine, 1985, 13 pages.

* cited by examiner

*Primary Examiner* — Atif Chaudry
(74) *Attorney, Agent, or Firm* — Kolisch Hartwell, P.C.

(57) ABSTRACT

A deresonated fluid system may include a pressurizable fluid line having distal, opposite line ends with the fluid line extending between the line ends. A source may be configured to apply variations in pressure of fluid in the fluid line having a frequency appropriate for producing a standing wave in the fluid line between the line ends. A fluid coupler having opposite first and second coupler ends may be attached to the fluid line in a medial portion of the fluid line between the line ends. A flow acceleration ramp may be formed about an inside of the first coupler end. An artificial acoustic shoulder may be formed about an inside of the second coupler end. The artificial acoustic shoulder may define a substantially central orifice in fluid communication with the flow acceleration ramp.

19 Claims, 2 Drawing Sheets

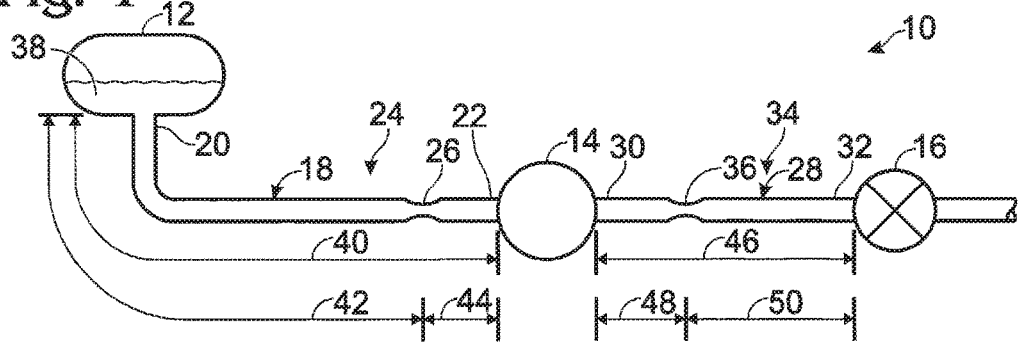
Fig. 1
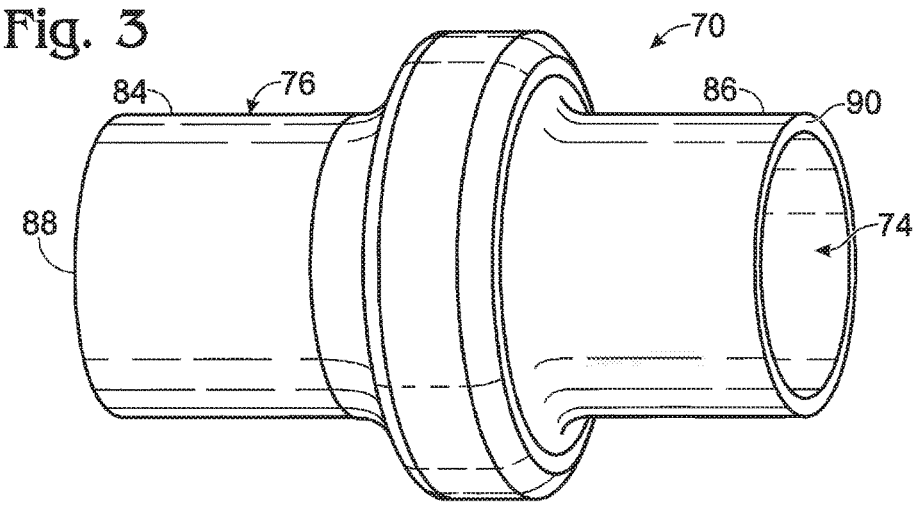
Fig. 2
APPLYING VARIATIONS IN PRESSURE OF FLUID IN A FLUID LINE APPROPRIATE FOR PRODUCING A STANDING WAVE
DETERMINING A WAVELENGTH OF THE STANDING WAVE
INSERTING A FLUID-LINE DERESONATOR INTO THE FLUID LINE IN A MEDIAL PORTION OF THE FLUID LINE
Fig. 3

PRESSURIZED FLUID LINE DERESONATOR

FIELD

This disclosure relates to pressurized fluid systems having fluid lines capable of exhibiting resonance. More specifically, the disclosed embodiments relate to systems, devices, and methods for modifying the resonant length of a pressurized fluid line.

BACKGROUND

Fluid flow variation in a fluid line causes pressure variation in the fluid which can establish a resonant condition of standing pressure waves along the length of a fluid filled line due to waves reflecting from the ends of the fluid line. Fluid flow variation may be caused by a device moving fluid in the fluid line, such as when the fluid is excited by an input flow variation produced by a pump with sinusoidal motion of its pistons. Hydraulic lines, for example, resonate at their natural frequency with little excitation similar to an organ pipe. A standing wave is formed at the resonant frequency, creating pressure oscillations in the hose or tube forming the fluid line, or combination of hose and tube forming the fluid line. Hydraulic pumps provide excitation at a frequency equal to pump revolutions per minute (rpm) times the number of pump pistons. If the pump discharge line natural frequency is near this pumping frequency, a resonance will result. Pressure pulses created by the resonant condition can cause failures in hoses, fittings and clamps. Resonance pressure pulses within a hose causes hysteresis heating of the rubber/elastic parts of the hose and concomitant damage from the temperature excursions.

Methods available today are to change the tube length or diameter to change its resonant frequency. Often this is impractical due to physical constraints of location for the tube, the tube routing, friction loss if the tube is too small, or excessive weight if made larger. Resonating tubes are restrained by clamps and end fittings which can sustain damage and come loose when resonating tubes vibrate. Leakage and system loss have been experienced due to these effects. Additionally a Helmholtz type resonator can be added and tuned to the resonant frequency attempting to dampen a narrow range of oscillation. This method is only partially effective and can result in an improved condition but the basic problem remains.

SUMMARY

The present disclosure provides deresonating of pressurized fluid lines. In some embodiments, deresonating of a fluid line may include a fluid-line deresonator. A fluid-line deresonator may include a fluid coupler having opposite first and second coupler ends configured to be attached to a fluid line capable of resonating while the fluid line is filed with pressurized fluid. A flow acceleration ramp may be formed about an inside of the first coupler end. An artificial acoustic shoulder may be formed about an inside of the second coupler end. The artificial acoustic shoulder may define a substantially central orifice in fluid communication with the flow acceleration ramp In some embodiments, a deresonated fluid system may include a pressurizable fluid line having distal, opposite line ends with the fluid line extending between the line ends. A source may be configured to apply variations in pressure of fluid in the fluid line having a frequency appropriate for producing a standing wave in the fluid line between the line ends. A fluid coupler having opposite first and second coupler ends may be attached to the fluid line within a medial portion of the fluid line between the line ends. A flow acceleration ramp may be formed about an inside of the first coupler end. An artificial acoustic shoulder may be formed about an inside of the second coupler end. The artificial acoustic shoulder may define a substantially central orifice in fluid communication with the flow acceleration ramp.

In some embodiments, a method may include applying variations in pressure of fluid in a fluid line having distal, opposite line ends. The pressure variations may have a frequency appropriate for producing a standing wave in the fluid line between the line ends. A fluid-line deresonator may be inserted into the fluid line in a medial portion of the fluid line between and spaced from the line ends. The fluid-line deresonator may have a flow acceleration ramp and an artificial acoustic shoulder. The artificial acoustic shoulder may define a substantially central orifice in fluid communication with the flow acceleration ramp.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is an illustration of an example of a deresonated fluid system.

FIG. 2 is a flow chart illustrating an exemplary method of deresonating a fluid line.

FIG. 3 is an isometric view of a first example of a coupler configured to deresonate a fluid line.

DESCRIPTION

Overview

Figure 4:
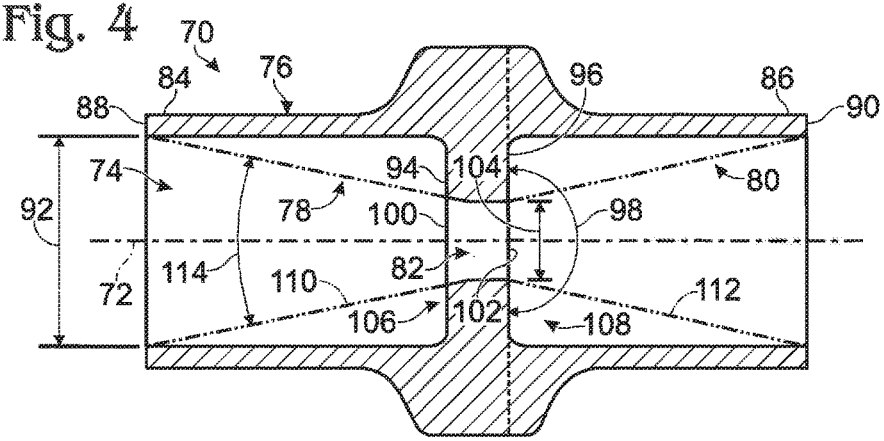
FIG. 4 is a cross-section of the coupler of FIG. 3.

Various embodiments of a deresonated fluid-line system and deresonator having are described below and illustrated in the associated drawings. Unless otherwise specified, a fluid-line system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other fluid-line components or systems having fluid lines. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

As mentioned above, a fluid system having fluid lines may be found to resonate when a source producing pressure variations in the fluid is operating. The speed of sound traveling in a fluid depends on the bulk modulus and the mass density of the fluid. The wavelength of a cyclical pressure variation in the fluid line is equal to the speed of sound in the fluid divided by the frequency of the pressure variation. For example, a fluid pump can be a source of pressure variation the frequency of which is dependent on the rotary speed of the pump shaft in revolutions per second times the number of pistons acting on the shaft during each revolution. A functional or effective physical length of an open-end fluid line will also be a resonant length if the functional length is an integral number of half-wavelengths long. A functional or effective physical length of a closed-end fluid line will also be a resonant length if the functional length is an odd integral number of quarter-wavelengths long. Altering the effective functional length from a resonant length may reduce or eliminate damaging resonance.

Definitions

"Deresonate" is the removal or attenuation or frequency shifting of, or constructive interference with resonance from a pressurizable fluid line.

"Deresonator" refers to a device that deresonates a pressurizable fluid line.

EXAMPLES, COMPONENTS, AND ALTERNATIVES

The following sections describe selected aspects of exemplary fluid-line deresonators as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Referring initially to FIG. 1, an exemplary fluid system is shown generally at 10. Fluid system 10 includes a reservoir 12, a pump 14, and a valve 16. A first fluid line 18 extends between a line end 20 connected to reservoir 12 and an opposite, distal line end 22 connected to pump 14. Positioned in a medial portion 24 of fluid line 18 is a deresonator 26. A second fluid line 28 extends between a line end 30 connected to pump 14 and an opposite, distal line end 32 connected to valve 16. Positioned in a medial portion 34 of fluid line 28 is a deresonator 36. Examples of deresonators that may be used for deresonators 26 and 36 are described in further detail below with reference to FIGS. 3-6. A fluid 38 may be pumped by pump 14 out of reservoir 12 and through valve 16.

Fluid line 18 has an overall functional length 40. Deresonator 26 is positioned a distance 42 from line end 20 and a distance 44 from line end 22. Since line end 20 is connected to reservoir 12, that end of fluid line 18 is subject to the atmosphere having the ambient pressure. Fluid line 28 has an overall functional length 46. Deresonator 36 is positioned a distance 48 from line end 30 and a distance 50 from line end 32.

A pump, then, is one example of a source applying variations in pressure in the fluid line. When pump 14 operates at R revolutions per minute (rpm) using S pistons, it produces R×S pressure variations or impulses per minute to the fluid in fluid lines 18 and 28. This equates to a frequency of (R×S)/60 pulses per second or Hertz. For example, a pump having nine pistons and operating at 5500 rpm produces 825 pulses per second.

Example 2

This example is a method for deresonating a presurizable fluid line; see FIG. 2. Aspects of fluid system 10 may be utilized in the method steps described below. Where appropriate, reference may be made to previously described components and systems that may be used in carrying out each step. These references are for illustration, and are not intended to limit the possible ways of carrying out any particular step of the method.

FIG. 2 is a flowchart illustrating steps performed in an illustrative method, and may not recite the complete process or all steps of the method. FIG. 2 depicts multiple steps of a method, generally indicated at 60, which may be performed in conjunction with fluid system 10. Although various steps of method 60 are described below and depicted in FIG. 2 the steps need not necessarily all be performed, and in some cases may be performed in a different order than the order shown.

At step 62, variations in pressure are applied to a fluid in a fluid line, such as to fluid 38 in fluid line 18 or fluid line 28, appropriate for producing a standing wave in the fluid line 18 or 28 between respective line ends 20, 22 or 30, 32 prior to placement of deresonators 26, 36 in the fluid lines 18, 28. If length 40 of fluid line 18 or length 46 of fluid line 28 is a resonant length, the fluid line 18 or 28 will resonate during pumping of fluid 38. Resonance may be observed by movement of fluid system components, particularly, the fluid lines 18, 28, or a resonant length may by computed based on the characteristics of pump 14, fluid 38, and fluid lines 18, 28 using known techniques. See, for example, the text "Hydraulic System Analysis," by George R. Keller, originally published by Penton Publishing of Cleveland, Ohio.

At step 64, a wavelength of a standing wave during resonance of fluid 38 in fluid line 18 or 28 may be determined using observations made of the fluid lines 18, 28 during operation of pump 14. Additionally or optionally, the wavelength of fluid pressure variations produced by pump 14 may be computed from the characteristics of the fluid 38 and fluid lines 18, 28, as part of the computations performed for determining resonant length.

If fluid line 18 or 28 is determined to have a resonant length between opposite, distal ends 20, 22 or 30, 32, at step 66, deresonator 26 or 36 may be inserted into the respective fluid line 18 or 28 in medial portion 24 or 34. The presence of deresonators 26, 36 may divide the respective fluid lines into shorter fluid lines. Specifically, deresonator 26, divides fluid line 18 into two fluid lines having respective lengths 42 and 44, preventing the full fluid line 18 from further resonating between opposite, distal ends 20, 22. Similarly, deresonator 36 divides fluid line 28 into two fluid lines having respective lengths 48 and 50.

Preferably, the placement of deresonators 26, 36 are positioned in respective medial portions 24, 34 of fluid lines 18, 28 so that the shorter resulting fluid lines do not resonate. In this regard, fluid line 18 may be considered an open-end fluid line since fluid-line end 20 is connected to reservoir 12, which subjects fluid 38 in the reservoir to atmospheric conditions. Fluid line lengths 42 and 44 are selected that are not an integral number of half-wavelengths long from respective fluid-line ends 20, 22. Preferably, deresonator 26 is disposed at least one-tenth of the wavelength from a nearest position in the fluid line that is an integral number of half wavelengths from one of line ends 20, 22.

Fluid line 28 may be considered a closed-end fluid line since fluid-line ends 30, 32 are respectively connected to the pump and valve, both of which are closed to the atmosphere. Deresonator 36 then is preferably positioned in medial portion 34 at least one tenth of the wavelength from a nearest position that is an odd integral number of quarter-wavelengths from one of the line ends 30, 32. That is, the position of deresonator 36 is selected so that line lengths 48 and 50 are not resonant line lengths.

Example 3

This example is a deresonator, shown generally at 70 in FIGS. 3 and 4, providing an artificial end when used as a deresonator 26 or 36 in a pressurized fluid line 18 or 28 for interrupting standing waves in the fluid 38 having pressure variations occurring at resonant frequencies. FIG. 3 is an isometric view of deresonator 70 and FIG. 4 is a longitudinal cross-section taken along a longitudinal axis 72 of deresonator 70. Deresonator 70 defines an internal fluid passageway 74 and includes a coupler 76, opposite passageway transitions 78, 80, and a medial or central channel 82. Deresonator 70 is generally tubular shaped with fluid passageway 74 extending along longitudinal axis 72. A deresonator may also extend along a curved or irregular path or have a different general configuration suitable for a particular application.

Coupler 76 includes opposite first and second coupler ends 84, 86. First coupler end 84 has a terminal edge 88, and second coupler end 86 has a terminal edge 90 that is distal from and opposite to terminal edge 88. Coupler ends 84, 86 are shown as cylindrical sleeves to simplify illustration. Accordingly, terminal edges 88, 90 are each circular as viewed axially and have internal diameters equal to 92.

Coupler ends 84, 86 may have any suitable length and configuration appropriate for securing them to respective intermediate ends of a fluid line 18 or 28 using conventional structures and techniques. For example, coupler ends 84, 86 may be made of a suitable metal for attachment by welding, or may have internal or external threads for attachment to a complementarily threaded fluid-line component, or circumferentially extending ribs for friction fit to a fluid-line tube.

In this example, passageway transitions 78, 80 have uniform configurations with a constant diameter 92 from terminal edges 88, 90 to positions proximate central channel 82. Proximate central channel 82, passageway transitions 78, 80 transition from the cylindrical configuration to a respective transverse face 94, 96 that extends normal to longitudinal axis 72, as shown. In other words, portions of each transverse face 94, 96 on opposite sides of longitudinal axis 72 extend at an included angle 98 of 180 degrees. In this example, transverse faces 94, 96 are normal to a direction of general fluid flow in passageway 74 along longitudinal axis 72.

Central channel 82 defines at least one central orifice, such as central orifices 100, 102 through which fluid 38 passes in entering or exiting central channel 82. In this example, central orifices 100, 102 are openings at each end of central channel 82. Central orifice 102 has a diameter 104 that is slightly smaller than a diameter of central orifice 100. These orifices may have different sizes and configurations, or may have the same size and configuration. For example, central channel 82 is shown to vary in diameter along its axial length, but it may also be uniform, such as a cylindrical configuration having a constant diameter 92. Central channel 82 may also have any suitable axial length, although shorter lengths may be preferred for improved fluid flow efficiency.

It will be appreciated, that transverse faces 94, 96 surrounding respective central orifices 100, 102 constitute respective artificial, acoustic shoulders 106, 108. Acoustic shoulder 106 may substantially reflect a pressure wave traveling past coupler terminal edge 88 toward central orifice 100. Similarly, acoustic shoulder 108 may substantially reflect a pressure wave traveling past coupler terminal edge 90 toward central orifice 102.

The greater the size of the acoustic shoulders 106, 108, the more that an impinging acoustic wave will be reflected. However, the smaller the relative sizes of central orifices 100, 102, the greater the resistance to fluid flow, and the less efficient the deresonator 70 is in passing fluid 38 being pumped through fluid lines 18, 28. Central orifices 100, 102 have respective cross-sectional areas normal to a direction of fluid flow along longitudinal axis 72 determined by the diameters of central orifices 100, 102, such as diameter 104 of central orifice 102. Similarly the insides of the coupler ends 84, 86 proximate terminal edges 88, 90, have cross-sectional areas normal to the longitudinal axis 72 determined by diameters 92. It is preferable that the cross-sectional area of the central orifices 100, 102 be less than one half of the cross-sectional area of the coupler ends 84, 86 at the openings defined by terminal edges 88, 90. Further improved reduction of resonance may be realized by a central-orifice cross-sectional area that is less than one-fourth of the cross-sectional area at terminal edges 88, 90, such as about one sixth of the cross-sectional area of the coupler ends or of the proximate fluid line 18 or 28 when connected in a fluid system 10.

One or both of passageway transitions 78, 80 may have other configurations as well. For example, passageway transitions 78, 80 may vary gradually or incrementally between the configuration of terminal edges 88, 90 and respective proximal central orifices 100, 102, forming what may be referred to as acceleration ramps 110, 112. Passageway transitions 78, 80 may also be irregular or regular in configuration. As examples, acceleration ramps 110, 112 may taper uniformly between a terminal edge of the first coupler end and the central orifice, as shown in FIG. 4 in dash double-dot lines. With circular terminal edges 88, 90, and central orifices 100, 102, acceleration ramps 110, 112 may have a frustoconical configuration. The included angle 114 of the opposite sides of the acceleration ramps 110, 112 is preferably 15-degrees or more for resonance reduction while providing improved fluid-flow efficiency.

Example 4

Figure 5:
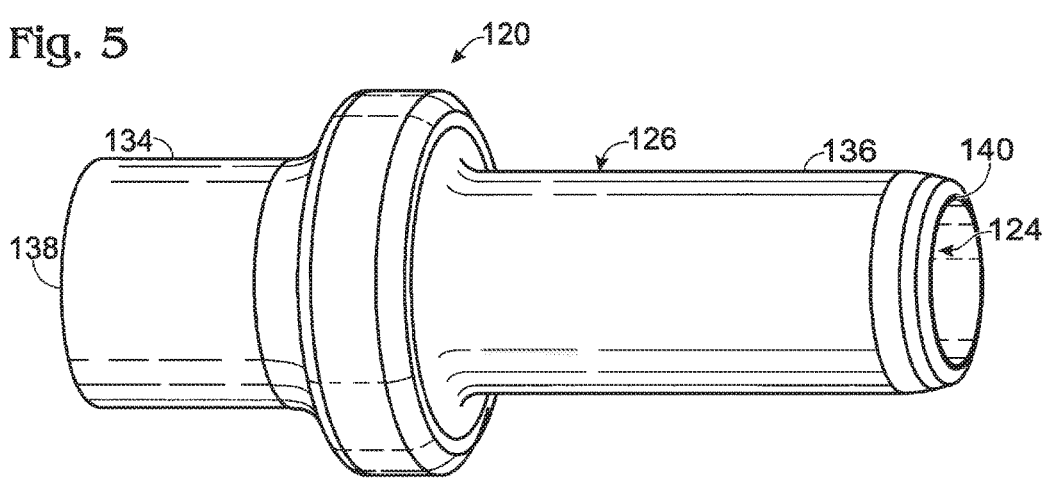
FIG. 5 is an isometric view of a second example of a coupler configured to deresonate a fluid line.
Figure 6:
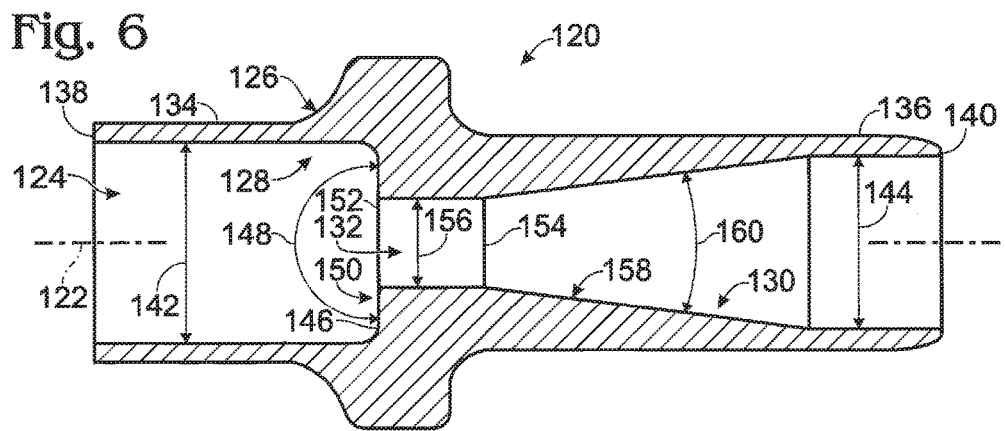
FIG. 6 is a cross section of the coupler of FIG. 5.

This example is an illustrative deresonator having an artificial acoustic shoulder and an acceleration ramp; see FIGS. 5 and 6.

In this example, a deresonator is shown generally at 120 in FIGS. 5 and 6, suitable for use as a deresonator 26 or 36. FIG. 5 is an isometric view of deresonator 120 and FIG. 6 is a longitudinal cross-section taken along a longitudinal axis 122 of deresonator 120. Deresonator 120 defines an internal fluid passageway 124 and includes a coupler 126, opposite passageway transitions 128 and 130, and a central channel 132. Deresonator 120 is generally tubular shaped with fluid passageway 124 extending along longitudinal axis 122.

Coupler 126 includes opposite first and second coupler ends 134, 136. First coupler end 134 has a terminal edge 138, and second coupler end 136 has a terminal edge 140 that is distal from and opposite to terminal edge 138. Coupler ends 134, 136 are shown as cylindrical sleeves. Accordingly, terminal edges 138, 140 are each circular as viewed axially and have respective diameters equal to 142 and 144.

Coupler end 134 may have a generally extended length and have an outer surface configuration suitable for insertion into a tubular section of fluid line 18 or 28 for a friction connection. Coupler end 136 may have a generally shorter length suitable for a threaded or welded connection to another fixture on fluid line 18 or 28.

In this example, passageway transition 128 has a constant diameter 142 from terminal edges 138, 140 to proximate central channel 132. Proximate central channel 132, passageway transition 128 transitions from the cylindrical configuration to a transverse face 146 that extends normal to longitudinal axis 122, as shown. In other words, portions of transverse face 146 on opposite sides of longitudinal axis 122 extend at an included angle 148 of 180 degrees. In this example, transverse face 146 is normal to a direction of general fluid flow in passageway 124 along longitudinal axis 122, forming thereby an artificial acoustic shoulder 150. Acoustic shoulder 150 may substantially reflect a pressure wave traveling past coupler terminal edge 138 toward central channel 132.

Central channel 132 defines at least one central orifice, such as central orifices 152, 154 through which fluid 38 passes in entering or exiting central channel 132. In this example, central orifices 152, 154 are openings at each end of central channel 132. Central channel 132, including central orifices 152, 154, is cylindrical in shape, having a diameter 156. Central channel 132 may also have any suitable axial length, although shorter lengths may be preferred for improved fluid flow efficiency. In some examples, central channel 132 does not exist, and passageway transitions 128, 130 meet at a common orifice, such as central orifice 152.

Passageway transition 130 varies gradually between the configuration of terminal edge 140 and proximal central orifice 154, forming an acceleration ramp 158. Acceleration ramp 158 tapers uniformly between terminal edge 140 of coupler end 136 and central orifice 154, as shown in FIG. 6. As mentioned, acceleration ramp 158 may alternatively taper to central orifice 152, in which case there would be no central channel 132 or central orifice 154. With circular terminal edge 140 and circular central orifice 154, acceleration ramp 158 has a frustoconical configuration. The included angle 160 of the opposite sides of the acceleration ramp 158 is preferably 15-degrees or more for resonance reduction while providing improved fluid-flow efficiency. Preferably fluid flow is from right to left as shown in FIG. 6 so that fluid 38 enters coupler end 136, and accelerates, progressively increasing in speed, as it passes through acceleration ramp 158.

Central orifices 152, 154 have respective cross-sectional areas normal to a direction of fluid flow along longitudinal axis 122 determined by the diameter 156. Similarly the insides of the coupler ends 134, 136 proximate terminal edges 138, 140, have cross-sectional areas normal to the longitudinal axis 122 determined by respective diameters 142, 144. It is preferable that the size of the central orifices 152, 154 be less than one half of the cross-sectional areas of the coupler ends 134, 136 at the openings defined by terminal edges 138, 140. Further improved reduction of resonance may be realized by a central-orifice cross-sectional area that is less than one-fourth of the cross-sectional area of coupler-ends 134, 136 at terminal edges 138, 140 or associated fluid-line cross-sectional areas. For example the central-orifice cross-sectional area may be about one sixth, or at least one seventh, of the cross-sectional areas of the openings defined by terminal edges 138, 140 or of the proximate fluid line 18 or 28 when connected in a fluid system 10.

The greater the size of acoustic shoulder 150, the more that an impinging acoustic wave will be reflected. However, the smaller the relative size of central orifices 152, 154, the greater the resistance to fluid flow and the less efficient deresonator 120 is in passing fluid 38 being pumped through fluid lines 18, 28.

Example 5

This section describes additional aspects and features of deresonators and fluid line deresonating, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A fluid-line deresonator, comprising:
a fluid coupler having opposite first and second coupler ends configured to be attached to a fluid line capable of resonating while the fluid line is filed with pressurized fluid;
a flow acceleration ramp formed about an inside of the first coupler end; and an artificial acoustic shoulder formed about an inside of the second coupler end, the artificial acoustic shoulder defining a substantially central orifice in fluid communication with the flow acceleration ramp.

A1. The fluid-line deresonator of paragraph A0, wherein the central orifice has a first cross-sectional area normal to a direction of fluid flow through the central orifice that is less than one half of a second cross-sectional area of the inside of the second coupler end distal from the acceleration ramp.

A2. The fluid-line deresonator of paragraph A1, wherein the first cross-sectional area is less than one-fourth of the second cross-sectional area.

A3. The fluid-line deresonator of paragraph A1, wherein the first cross-sectional area is about one sixth of the second cross-sectional area.

A4. The fluid-line deresonator of paragraph A0, wherein the artificial acoustic shoulder is spaced from a terminal edge of the second coupler end and the second opposite end defines a fluid passageway having a uniform cross-sectional configuration normal to a direction of fluid flow through the second coupler end between the terminal edge and the artificial acoustic shoulder.

A5. The fluid-line deresonator of paragraph A0, wherein the flow acceleration ramp tapers between a terminal edge of the first coupler end and the central orifice.

A6. The fluid-line deresonator of paragraph A5, wherein the flow acceleration ramp is frustoconical in shape.

A7. The fluid-line deresonator of paragraph A0, wherein the artificial acoustic shoulder extends from the central orifice normal to a direction of fluid flow through the central orifice and faces toward the first coupler end.

B0. A deresonated fluid system, comprising:
a pressurizable fluid line having distal, opposite line ends, the fluid line extending between the line ends;
a source configured to apply variations in pressure of fluid in the fluid line having a frequency appropriate for producing a standing wave in the fluid line between the line ends;
a fluid coupler having opposite first and second coupler ends attached to the fluid line in a medial portion of the fluid line between the line ends;
a flow acceleration ramp formed about an inside of the first coupler end; and an artificial acoustic shoulder formed about an inside of the second coupler end, the artificial acoustic shoulder defining a substantially central orifice in fluid communication with the flow acceleration ramp.

B1. The deresonated fluid system of paragraph B0, where the standing wave has a wavelength, and wherein the artificial acoustic shoulder is disposed in the fluid-line medial portion with the artificial acoustic shoulder disposed at least one-tenth of the wavelength from a nearest position in the fluid line that is an integral number of half wavelengths from one of the line ends when the fluid line is open ended and is an odd integral number of quarter wavelengths from one of the line ends when the fluid line is closed ended.

B2. The deresonated fluid system of paragraph B0, wherein the central orifice has a first cross-sectional area normal to a direction of fluid flow through the central orifice that is less than one half of a second cross-sectional area inside the fluid line proximate the second coupler end.

B3. The deresonated fluid system of paragraph B2, wherein the first cross-sectional area is less than one-fourth of the second cross-sectional area.

B4. The deresonated fluid system of paragraph B0, wherein the artificial acoustic shoulder is spaced from a terminal edge of the second coupler end and the second opposite end defines a fluid passageway having a uniform cross-sectional configuration normal to a direction of fluid flow through the second coupler end between the terminal edge and the artificial acoustic shoulder.

B5. The deresonated fluid line of claim B0, paragraph the flow acceleration ramp tapers between a terminal edge of the first coupler end and the central orifice.

B6. The deresonated fluid system of paragraph B5, wherein the flow acceleration ramp is frustoconical in shape.

B7. The deresonated fluid system of paragraph B0, wherein the artificial acoustic shoulder extends from the central orifice normal to a direction of fluid flow through the central orifice.

C0. A method comprising:
applying variations in pressure of fluid in a fluid line having distal, opposite line ends, the pressure variations having a frequency appropriate for producing a standing wave in the fluid line between the line ends; and
inserting a fluid-line deresonator into the fluid line in a medial portion of the fluid line between and spaced from the line ends, the fluid-line deresonator having a flow acceleration ramp and an artificial acoustic shoulder defining a substantially central orifice in fluid communication with the flow acceleration ramp.

C1. The method of paragraph C0, further comprising determining a wavelength of the standing wave, and wherein inserting into the fluid line a fluid-line deresonator includes inserting the fluid-line deresonator into the fluid line with the artificial acoustic shoulder at least one-tenth of a wavelength from a nearest position in the fluid line that is an integral number of half wavelengths from one of the line ends if the fluid line is open ended and that is an odd integral number of quarter wavelengths from one of the line ends if the fluid line is closed ended.

C2. The method of paragraph C0, wherein inserting into the fluid line a fluid-line deresonator includes inserting into the fluid line a fluid-line deresonator having an artificial acoustic shoulder that is sufficiently transverse to a direction of fluid flow through the central orifice to partially reflect a pulse of pressurized fluid impinging the artificial acoustic shoulder from the fluid line.

C3. The method of paragraph C2, wherein inserting into the fluid line a fluid-line deresonator includes inserting into the fluid line a fluid-line deresonator having a flow acceleration ramp that tapers from proximate the fluid line to the central orifice.

Advantages, Features, Benefits

The different embodiments of the deresonator described herein provide several advantages over known solutions for preventing or eliminating resonance in pressurized fluid lines. For example, the illustrative embodiments of deresonators described herein allow placement in a fluid line without changing the general structure of the fluid line. Additionally, and among other benefits, illustrative embodiments of the deresonators described herein create an artificial tube end while allowing continuing fluid flow. No known system or device can perform these functions. Thus, the illustrative embodiments described herein are particularly useful for hydraulic lines subject to relatively extended pumping. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A deresonated fluid system, comprising:
a pressurizable fluid line having distal, opposite line ends, the fluid line extending between the line ends;
a source configured to apply variations in pressure of fluid in the fluid line having a frequency appropriate for producing a standing wave in the fluid line between the line ends;
a fluid coupler having opposite first and second coupler ends attached to the fluid line in a medial portion of the fluid line between the line ends;
a flow acceleration ramp formed about an inside of the first coupler end; and
an artificial acoustic shoulder formed about an inside of the second coupler end, the artificial acoustic shoulder defining a substantially central orifice in fluid communication with the flow acceleration ramp;
wherein the standing wave has a wavelength, and the artificial acoustic shoulder is disposed at least one-tenth of the wavelength from a nearest position in the fluid line that is an integral number of half wavelengths from one of the line ends when the fluid line is open ended and that is an odd integral number of quarter wavelengths from one of the line ends when the fluid line is closed ended.

2. The deresonated fluid system of claim 1, wherein the central orifice has a first cross-sectional area normal to a direction of fluid flow through the central orifice that is less than one half of a second cross-sectional area inside the fluid line proximate the second coupler end.

3. The deresonated fluid system of claim 2, wherein the first cross-sectional area is less than one-fourth of the second cross-sectional area.

4. The deresonated fluid system of claim 1, wherein the artificial acoustic shoulder is spaced from a terminal edge of the second coupler end and the second coupler end defines a fluid passageway having a uniform cross-sectional configuration normal to a direction of fluid flow through the second coupler end between the terminal edge and the artificial acoustic shoulder.

5. The deresonated fluid system of claim 1, wherein the flow acceleration ramp tapers between a terminal edge of the first coupler end and the central orifice.

6. The deresonated fluid system of claim 5, wherein the flow acceleration ramp is frustoconical in shape.

7. The deresonated fluid system of claim 1, wherein the artificial acoustic shoulder extends from the central orifice normal to a direction of fluid flow through the central orifice.

8. A method comprising:
applying variations in pressure of fluid in a fluid line having distal, opposite line ends, the pressure variations having a frequency appropriate for producing a standing wave in the fluid line between the line ends;
inserting a fluid-line deresonator into the fluid line in a medial portion of the fluid line between and spaced from the line ends, the fluid-line deresonator having a flow acceleration ramp and an artificial acoustic shoulder defining a substantially central orifice in fluid communication with the flow acceleration ramp; and
determining a wavelength of the standing wave;
wherein inserting the fluid-line deresonator into the fluid line includes inserting the fluid-line deresonator at least one-tenth of a wavelength from a nearest position in the fluid line that is an integral number of half wavelengths from one of the line ends if the fluid line is open ended and that is an odd integral number of quarter wavelengths from one of the line ends if the fluid line is closed ended.

9. The method of claim 8, wherein inserting into the fluid line a fluid-line deresonator includes inserting into the fluid line a fluid-line deresonator having an artificial acoustic shoulder that is sufficiently transverse to a direction of fluid flow through the central orifice to partially reflect a pulse of pressurized fluid impinging the artificial acoustic shoulder from the fluid line.

10. The method of claim 9, wherein inserting into the fluid line a fluid-line deresonator includes inserting into the fluid line a fluid-line deresonator having a flow acceleration ramp that tapers from proximate the fluid line to the central orifice.

11. A method comprising:
applying variations in pressure of fluid in a fluid line having distal, opposite line ends, the pressure variations having a frequency appropriate for producing a standing wave in the fluid line between the line ends;
determining a wavelength of the standing wave;
inserting a fluid-line deresonator into the fluid line with an artificial acoustic shoulder of the fluid-line deresonator at least one-tenth of a wavelength from a nearest position in the fluid line that is an integral number of half wavelengths from one of the line ends if the fluid line is open ended and that is an odd integral number of quarter wavelengths from one of the line ends if the fluid line is closed ended, the fluid-line deresonator further having a flow acceleration ramp and the artificial acoustic shoulder defines a substantially central orifice in fluid communication with the flow acceleration ramp; and
causing fluid to flow in a general direction from the flow acceleration ramp toward the acoustic shoulder.

12. The method of claim 11, wherein inserting into the fluid line a fluid-line deresonator includes inserting into the fluid line a fluid-line deresonator having an artificial acoustic shoulder that is sufficiently transverse to a direction of fluid flow through the central orifice to partially reflect a pulse of pressurized fluid impinging the artificial acoustic shoulder from the fluid line.

13. The method of claim 11, wherein inserting into the fluid line a fluid-line deresonator includes inserting into the fluid line a fluid-line deresonator having a flow acceleration ramp that tapers from proximate the fluid line to the central orifice.

14. The method of claim 11, wherein the central orifice has a first cross-sectional area normal to a direction of fluid flow through the central orifice that is less than one half of a second cross-sectional area inside the fluid line.

15. The method of claim 14, wherein the first cross-sectional area is less than one-fourth of the second cross-sectional area.

16. The method of claim 11, wherein the artificial acoustic shoulder defines a fluid passageway having a uniform cross-sectional configuration normal to a direction of fluid flow.

17. The method of claim 11, wherein the flow acceleration ramp tapers between a terminal edge and the central orifice.

18. The method of claim 17, wherein the flow acceleration ramp is frustoconical in shape.

19. The method of claim 11, wherein the artificial acoustic shoulder extends from the central orifice normal to a direction of fluid flow through the central orifice.

* * * * *